United States Patent
Ferraiolo et al.

(10) Patent No.: US 7,080,288 B2
(45) Date of Patent: Jul. 18, 2006

(54) METHOD AND APPARATUS FOR INTERFACE FAILURE SURVIVABILITY USING ERROR CORRECTION

(75) Inventors: Frank David Ferraiolo, Essex Junction, VT (US); Michael Stephen Floyd, Austin, TX (US); Robert James Reese, Austin, TX (US); Kevin Franklin Reick, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 10/425,423

(22) Filed: Apr. 28, 2003

(65) Prior Publication Data

US 2004/0216026 A1    Oct. 28, 2004

(51) Int. Cl.
*G06F 11/22* (2006.01)
(52) U.S. Cl. .................. 714/43; 714/56; 714/700
(58) Field of Classification Search ............. 714/43, 714/56, 700, 703
See application file for complete search history.

(56) References Cited

U.S. PATENT DOCUMENTS

| | | | | |
|---|---|---|---|---|
| 3,688,265 A | * | 8/1972 | Carter et al. | 714/763 |
| 3,766,521 A | * | 10/1973 | Carter et al. | 714/757 |
| 3,949,208 A | * | 4/1976 | Carter | 714/765 |
| 4,750,177 A | * | 6/1988 | Hendrie et al. | 714/748 |
| 4,888,773 A | * | 12/1989 | Arlington et al. | 714/764 |
| 5,313,624 A | * | 5/1994 | Harriman et al. | 714/6 |
| 5,790,776 A | * | 8/1998 | Sonnier et al. | 714/10 |
| 5,819,053 A | * | 10/1998 | Goodrum et al. | 710/100 |
| 5,835,704 A | * | 11/1998 | Li et al. | 714/42 |
| 5,867,501 A | * | 2/1999 | Horst et al. | 370/474 |
| 6,032,271 A | * | 2/2000 | Goodrum et al. | 714/56 |
| 6,237,116 B1 | * | 5/2001 | Fazel et al. | 714/720 |
| 6,295,617 B1 | * | 9/2001 | Sonobe | 714/718 |
| 6,397,357 B1 | * | 5/2002 | Cooper | 714/703 |
| 6,535,945 B1 | * | 3/2003 | Tobin et al. | 710/305 |
| 6,609,221 B1 | * | 8/2003 | Coyle et al. | 714/715 |
| 6,711,059 B1 | * | 3/2004 | Sinclair et al. | 365/185.11 |
| 6,792,567 B1 | * | 9/2004 | Laurent | 714/763 |

* cited by examiner

*Primary Examiner*—Stephen M. Baker
(74) *Attorney, Agent, or Firm*—Mitch Harris, Atty at Law, LLC; Andrew M. Harris; Casimer K. Salys

(57) ABSTRACT

A method an apparatus for interface failure survivability using error correction provides operation of an interface when a number of bits of the interface less than or equal to available error correction depth are present. Initialization tests are used to determine whether the interface errors due to failed interconnects or circuits can be corrected, or whether the interface must be disabled. Subsequent alignment at initialization or during operation idle periods may be disabled for any failed bit paths. The failed bit path indications are determined and maintained in hardware, and used to bypass subsequent calibrations that could otherwise corrupt the interface. A fault indication specifying total failure may be generated and used to shut down the interface and/or connected subsystem in response to an uncorrectable condition and request immediate repair. A second fault indication specifying correctable failure may be generated and used to indicate a need for eventual repair.

20 Claims, 4 Drawing Sheets

METHOD AND APPARATUS FOR INTERFACE FAILURE SURVIVABILITY USING ERROR CORRECTION

BACKGROUND OF THE INVENTION

1. Technical Field

The present invention relates generally to electronic interface operation, and more particularly, to interfaces that are tested for fault detection and calibration prior to and/or during operation.

2. Description of the Related Art

Interfaces between present-day integrated circuits have increased in operating frequency and width. In particular, multiprocessing systems, where multiple processors are arranged in an array or a cube, both wide and fast connections are provided between many processing units. Data width directly affects the speed of data transmission between systems components, as does the data rate, which is limited by the maximum frequency that can be supported by an interface.

Present-day systems interconnect designs use transmission line techniques to improve signal transmission/reception. Low voltage and current signaling levels are desirable to reduce driver size, power consumption/dissipation and electromagnetic interference (EMI). The interface schemes used for the above-mentioned interconnect designs are incorporating an increasing amount of intelligence and flexibility, along with incorporating the consequent circuit complexity to support these features. In particular, interfaces such as those disclosed in U.S. Patent Application "ELASTIC INTERFACE APPARATUS AND METHOD THEREFOR", publication number US2002/0013875A1, incorporated herein by reference, discloses an exemplary interface that can synchronize asynchronously transmitted data streams between two interconnected subsystems. An interface alignment procedure (IAP) is performed at initialization and optionally dynamically during operation in order to maintain optimum synchronization, which reduces the bit error rate (BER) of the interface.

Interfaces such as the EI described above, especially when incorporated within multiprocessing systems where errors from a single unit can corrupt operation and data within the entire system, employ sophisticated initialization test procedures that, in addition to the IAP mentioned above, are used to verify proper DC (static) and AC (dynamic) operation of the interface prior to and optionally during operation of the system. Failure of the DC and AC tests due to an interface fault is typically used to disable the interface and generate an interface failure indication. Recalibration procedures and initial calibration such as IAP are typically not performed on interfaces that do not pass initial wire test, as the interface is not used subsequent to detecting a failure. A recalibration procedure could also enter a fail state or otherwise generate an erroneous setting if performed on an interface connection that has one or more faulty bits. U.S. Patent Application "METHOD AND APPARATUS FOR ELASTIC SHORTS TESTING, A HARDWARE-ASSISTED WIRE TEST MECHANISM", publication number. US2002/0078402A1, describes a wire test mechanism and U.S. patent application "DATA PROCESSING SYSTEM AND METHOD WITH DYNAMIC IDLE FOR TUNABLE INTERFACE CALIBRATION", Ser. No. 09/946,217 filed Sep. 5, 2001, describes a periodic recalibration of an EI. The above-referenced patent applications are incorporated herein by reference.

Present-day high-speed interfaces such as the Elastic Interface (EI) of the above-incorporated patent applications typically may further include error checking and correcting (ECC) circuitry that provides tolerance to at least single-bit errors on the interface by correcting single-bit errors on-the-fly. A tradeoff between the number of bits required to detect and correct errors versus the data width typically renders a choice for interface hardware connections of double-bit detection and single-bit correction, but "stronger" ECC may also be employed at the expense of additional interface bit width. Such ECC circuitry is used to correct transient errors on an interface, but will also provide proper interface operation for a failure of a number of interface connections that is less than or equal to the ECC correction capacity, if the failure(s) occur(s) subsequent to initialization of the interface, and if dynamic recalibration is not employed.

It is therefore desirable to provide a method and apparatus for surviving interface failures that takes advantage of correction of correctable errors. It is further desirable to provide a method and apparatus for surviving interface failures that occur prior to and subsequent to interface initialization.

SUMMARY OF THE INVENTION

The above-mentioned objective of surviving interface failures occurring prior to and subsequent to initialization that takes advantage of correction of correctable errors is provided in an interface method and apparatus.

The method and apparatus perform DC and/or AC wire testing on an interface carrying data with error checking and correction (ECC) coding, and determine a number of interface bit path failures. If no failures are found, the interface is operated normally, including alignment calibration if the interface so requires. If failures are found, and the number of failures is less than the number of correctable bit errors of the ECC, the interface is operated using the ECC to correct the failed bit path(s) and the alignment calibration, if required, can be skipped for the failed bit path(s). Finally, if the number of failures is greater than the number of correctable bit errors of the ECC, the interface is disabled.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
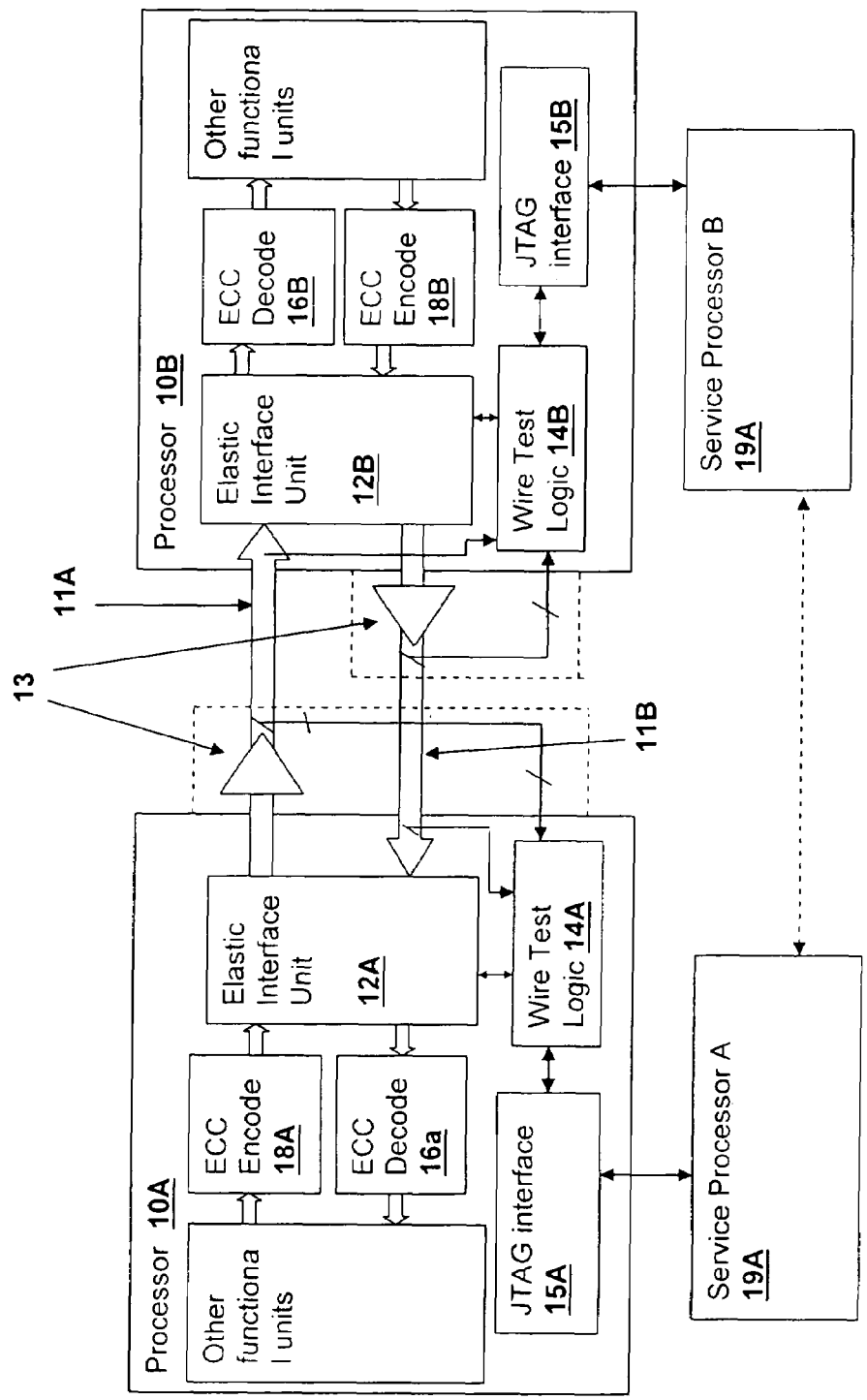
FIG. 1 is a block diagram of an interface connecting two processing blocks in a system in accordance with an embodiment of the invention.

With reference now to the figures, and in particular with reference to FIG. 1, an interface is depicted between two processors 10A and 10B. While processors 10A and 10B are used to illustrate and support the data connection of two units, the techniques of the present invention extend to address, control and other signal types, as well as connection of memories, peripherals and other functional units within a computer system or other electronic device. The interface between processors 10A and 10B is made by a physical connection of output signals 11A from processor 10A to inputs of processor 10B and output signals 11B from processor 10B to inputs of processor 10A, however the techniques of the present invention extend to non-physically connected (wireless) interfaces and to bi-directional interfaces, as well.

Within processors 10A and 10B, input signals are received by elastic interface (EI) units 12A and 12B, features of which are described in detail in the above-incorporated patents and patent applications. Output drivers 13 are preferably provided on-chip (but could be located off-chip) and receive ECC encoded data from ECC encode units 18A and 18B that provide the proper correctable bit patterns for transmission between processors 10A and 10B over interface connections 11A and 11B.

Signals on interface connections 11B and 11A are received by EI units 12A and 12B respectively and the output of EI units 12A and 12B are then provided to error checking and correction (ECC) decode units 16A and 16B that are capable of detecting 2-bit errors and correcting single bit errors. The Single Error Correct/Double Error Detect (SEC/DED) coding is selected for economy of bits (9 extra bits are required for a 64-bit interface), but the techniques of the present invention may be extended to any ECC correction capacity. The present invention uses ECC decode units 16A and 16B to not only correct dynamic bit errors as ECC units are typically employed to correct, but to maintain interface operation when a bit path has completely failed or has always been defective.

It is not desirable to permanently operate an interface in such a degraded condition because the interface will be unable to correct additional single bit "soft" errors occurring on the remainder of the interface if all of the ECC correction capacity is used to correct hard-failed bit paths. However, since the initial yield for integrated circuits and test boards used during the design evaluation phase traditionally is limited due to interface connectivity flaws, the ability to operate despite such flaws provides significant value for little added logic cost. Further, the ability to survive even a single path bit hard-failure in a production unit means that downtime can be almost completely eliminated for a single wire/driver failure, as a unit can continue operating while requesting service/replacement.

Wire test logic blocks 14A and 14B coordinate detection of shorts and opens on connections between drivers 13 and the inputs of EI units 12A and 12B, by walking a logical 1 and/or a logical 0 across driver 13 outputs and looking for the proper single 1 or 0 at the inputs of EI units 12A and 12B. The above-described test is referred to as a "DC wire test" since the walking bit patterns are not generated at the full interface speed. Wire test logic blocks 14A and 14B also perform AC wire testing using pseudo-random pattern generation and reception. JTAG Interfaces 15A and 15B provide a mechanism for controlling and checking the results of the tests performed by wire test logic blocks 14A and 14B, as well as other control, maintenance and test functions within processors 10A and 10B. JTAG Interfaces 15A and 15B are each coupled to a service processor 19A and 19B (which may be alternatively the same shared service processor) for controlling test operations such as the DC and AC wire tests described above.

EI units 12A and 12B include delay lines and control logic to support an interface that is aligned at initialization via an Interface Alignment Procedure (IAP) that tunes the input delay of EI units 12A and 12B to achieve the best attainable position (delay) of the input signals with respect to the clock used to latch or sample the input values. The interface may also be periodically recalibrated so that optimal operation of EI units 12A and 12B is maintained. The delay lines used to implement EI units 12A and 12B are sensitive to both supply voltage and temperature, so periodic recalibration provides for operation of the interface at higher frequencies and/or lower error rates than could otherwise be attained without recalibration.

The combination of the above-described wire tests and interface alignment procedure is performed at each interface initialization. In prior interface implementations, a failure at any point generates a hard error that will take the interface off-line. The initialization performs (in order): DC wire test, EI alignment (IAP) and AC (pattern) tests. The EI alignment is necessary for performing the AC tests, as the interface must be aligned before reliably transferring data. After initialization, periodic recalibration only is performed, and the recalibration is not as extensive as the initialization EI alignment procedure. Similarly, the presence of a fault on the interface will cause recalibration circuitry to fail and a resultant system outage will occur.

In the interface of the present invention, correctable failure of the above-listed tests and procedures lead to bypassing or otherwise circumventing the results of the above-listed tests and procedures in order to operate the interface with a number of faulty bit paths less than or equal to the number of ECC-correctable bits in the interface. The above-listed tests and procedures also yield information about how many and which bit paths (if any) have failed and provide signals that are used to bypass further tests and calibration for the faulty bit path(s).

Figure 2:
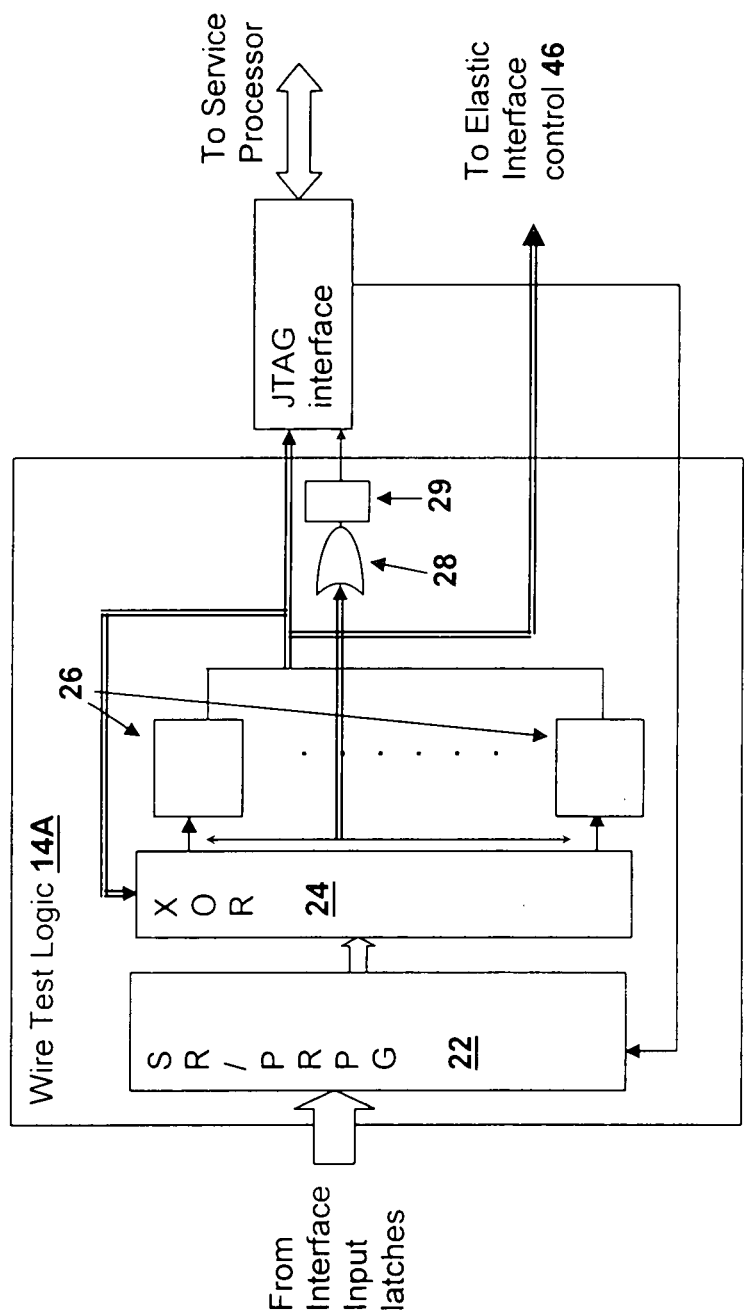
FIG. 2 is a block diagram of a wire test logic block in accordance with an embodiment of the invention.

Referring now to FIG. 2, details of wire test logic 14A (and similarly 14B) are shown. A shift register 22, also configurable as a pseudo-random pattern generator (PRPG), is coupled to the interface input latches of wire test logic 14A and may actually be incorporated in the input latch stage. When shift register 22 is in the shift register mode as directed by JTAG interface 15A in response to a command from service processor 19A, the above-described walking 1's and 0's test (EST or DC test) is performed to detect shorts, opens, driver failures, input latch failures, and other interface failures that yield "stuck" or inconsistent values. The output drivers of the opposing side of the interface, supply the test patterns for the DC test, which are generated by a pseudo-random pattern generator having the same pattern generation logic as shift register 22 when shift register 22 is in PRPG mode. A logical XOR section 24 forming a word comparator, detects differences between the shifted single-bit pattern for the DC tests or pseudo-randomly generated pattern for the AC tests, and a set of individual bit path failure latches 26 provide the result of each test, but disable individual bits in XOR gate 24 for the AC test if the associated bit path failure latch 26 bit is already set from the DC test. The above-described action prevents logical OR gate 28 from setting a global failure latch 29. The output of global failure latch 29 is provided to JTAG interface 15A as well as the output of bit path failure latches 26, so that an external service processor can determine if only a single bit path has failed (or a number of bit paths less than the ECC correction capacity for capacities greater than one bit) and not shut down the interface for the ECC correctable failure conditions.

Bit path failure latch 26 outputs are provided also to elastic interface unit 12A, for bypassing alignment and recalibration for failed bit paths that are correctable by ECC 16A. Service processor 19A determines whether or not the number of failed bit paths exceeds the ECC correction capacity, and generates either a high-level hard error that will disable the interface (and generally the system or portion of the system that is affected by the interface), or a lower-level error that indicates that repair or replacement of the failed interface component is required. Alternatively, specialized circuits can be designed into the component to automatically determine whether or not the fault will be survivable and to report interface status to the service processor accordingly.

Figure 3:
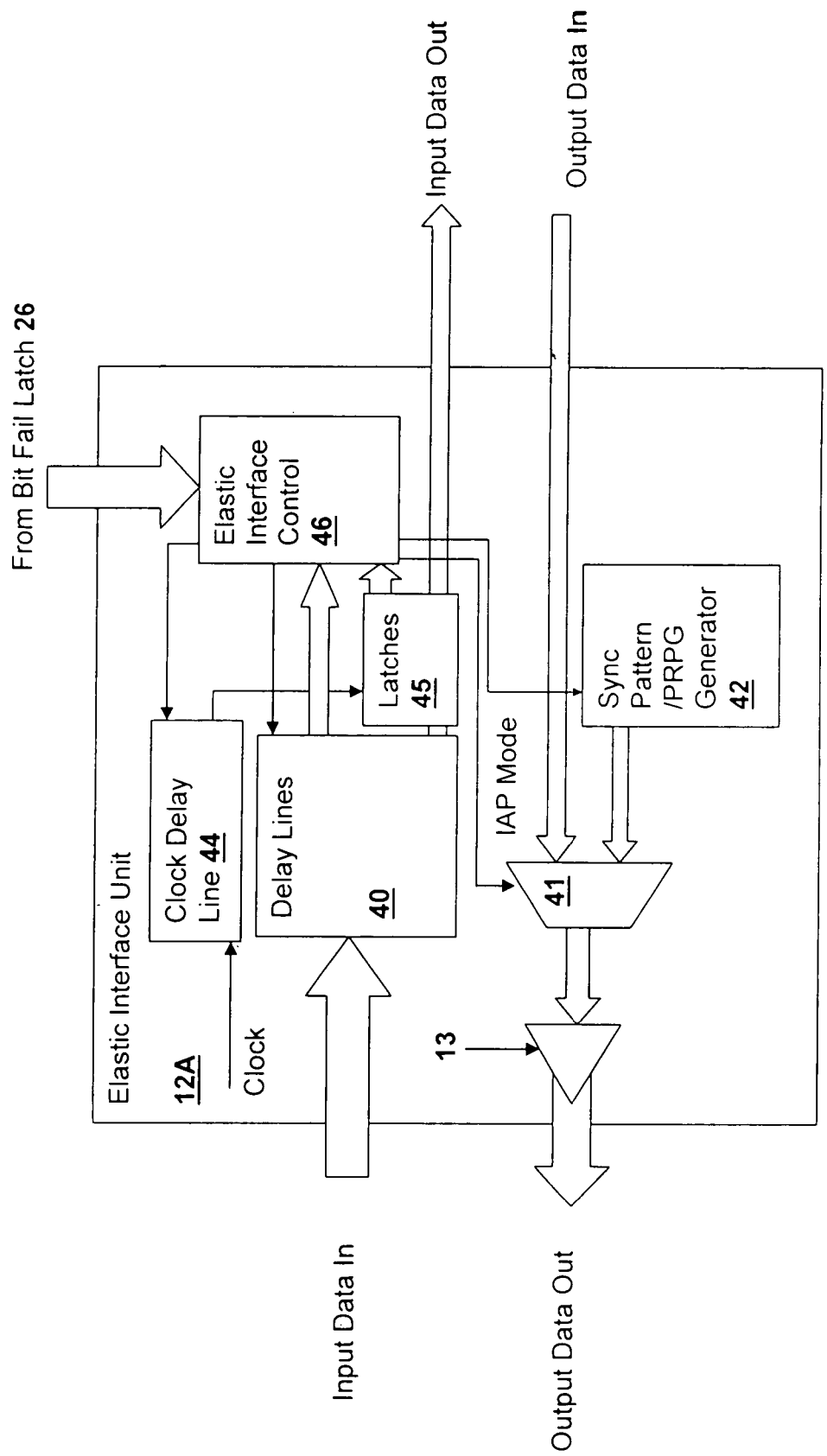
FIG. 3 is a block diagram of an interface unit within a processing block in accordance with an embodiment of the invention.

Referring now to FIG. 3, details of elastic interface unit 12A (and similarly elastic interface unit 12B) are depicted. A set of individual bit delay lines 40 provides for de-skew of data arriving at the inputs of elastic interface unit 12A, by adding delays to all bits other than the latest arriving bit signal(s). De-skew is performed only at initialization alignment (IAP) under the control of elastic interface control logic 46. De-skew is bypassed for any failed bit paths that are indicated by the signals provided from bit path failure latch 26, which at initialization will only be bits that have failed the DC test. However, other embodiments of the invention may perform de-skew operations at subsequent intervals, in which case AC test failed bit paths would also be disabled in the de-skew operation.

After de-skew at initialization and also during periodic recalibration, elastic interface control 46 selects a clock delay for clock delay line 44 that centers a latch enable provided to bit latches 45 in the center of the eye diagram for the data. Iterative techniques are used by elastic interface control 46, which contains edge detectors and guard-band logic for determining optimal clock position with respect to the de-skewed data output of delay lines 40. Elastic interface control 46 tests both edges of the data window for all bits, detecting the first edges of the earliest bit and the last edges of the latest bit and then centers the clock position in the middle of the composite data window by adjusting clock delay line 44. When looking for edges, bits set in bit path failure latches 26 cause elastic interface control 46 to force "good" states for failed bit paths (i.e., the failed bit paths are never detected as the first or last edges of the composite data window and thus will not cause a change in the setting of clock delay line 44).

A multiplexer 41 coupled to the provided output data is used to select between system or "mission" output data and sync/AC wiretest/recalibration patterns generated by sync/PRPG generator 42 for performing IAP/AC wiretest/recalibration in the remotely connected elastic interface unit 12B (and similarly, the patterns for performing the above-described tests on elastic interface unit 12A receiver circuits are provided by identical or similar output pattern generation circuits within elastic interface unit 12B). The output signals from multiplexer 41 are provided to drivers 13 for output on the interface wires. After IAP has been performed using the sync pattern mode of sync/PRPG generator 42, the AC tests provided by a pattern generation mode of sync/PRPG generator 42 that matches the pseudo-random pattern generation mode of wire test logic 14A are performed. During periodic recalibration, another PRPG pattern is used that provides a more precise alignment than the sync pattern mode of sync/PRPG generator 42 that generates random patterns simulating actual data transfer. A recalibration is generally forced before actively using the elastic interface, in order to perform more optimal alignment of clock delay line 44.

Additionally, in accordance with alternative embodiments of the present invention, the outputs of bit path failure latches 26 can be evaluated after both AC and DC testing, to determine whether new failures have occurred during AC testing that can be subsequently corrected by ECC (i.e., the first bit path failure occurs at AC testing or new failed bit path(s) are detected that increase the needed ECC correction capacity for surviving an interface failure).

Also, the failure of the IAP or periodic recalibration, depending on circuit configuration, may be used as a bit path failure detector by adding logic to elastic interface control 46 that determines an inability to adjust the interface delay lines to de-skew an individual bit path at IAP (i.e., the bit path has too much delay or too little delay with respect to other bit paths that exceeds the range of adjustability of delay lines 40). Also the ability at TAP or recalibration to adjust clock delay line 44 to compensate for one or more bits less than the ECC correction capacity in the composite data window adjustment may be used to indicate a failure. If the above-described facility is implemented for recalibration, then interface bit path failures may also be detected at run-time and signaled as faults. The TAP and recalibration can be repeated at idle in response to detection of a run-time failure of a correctable number of bit path failures, bypassing the failed bit path(s) so that the interface is properly aligned (including de-skew) without the failed bit path(s).

Figure 4:
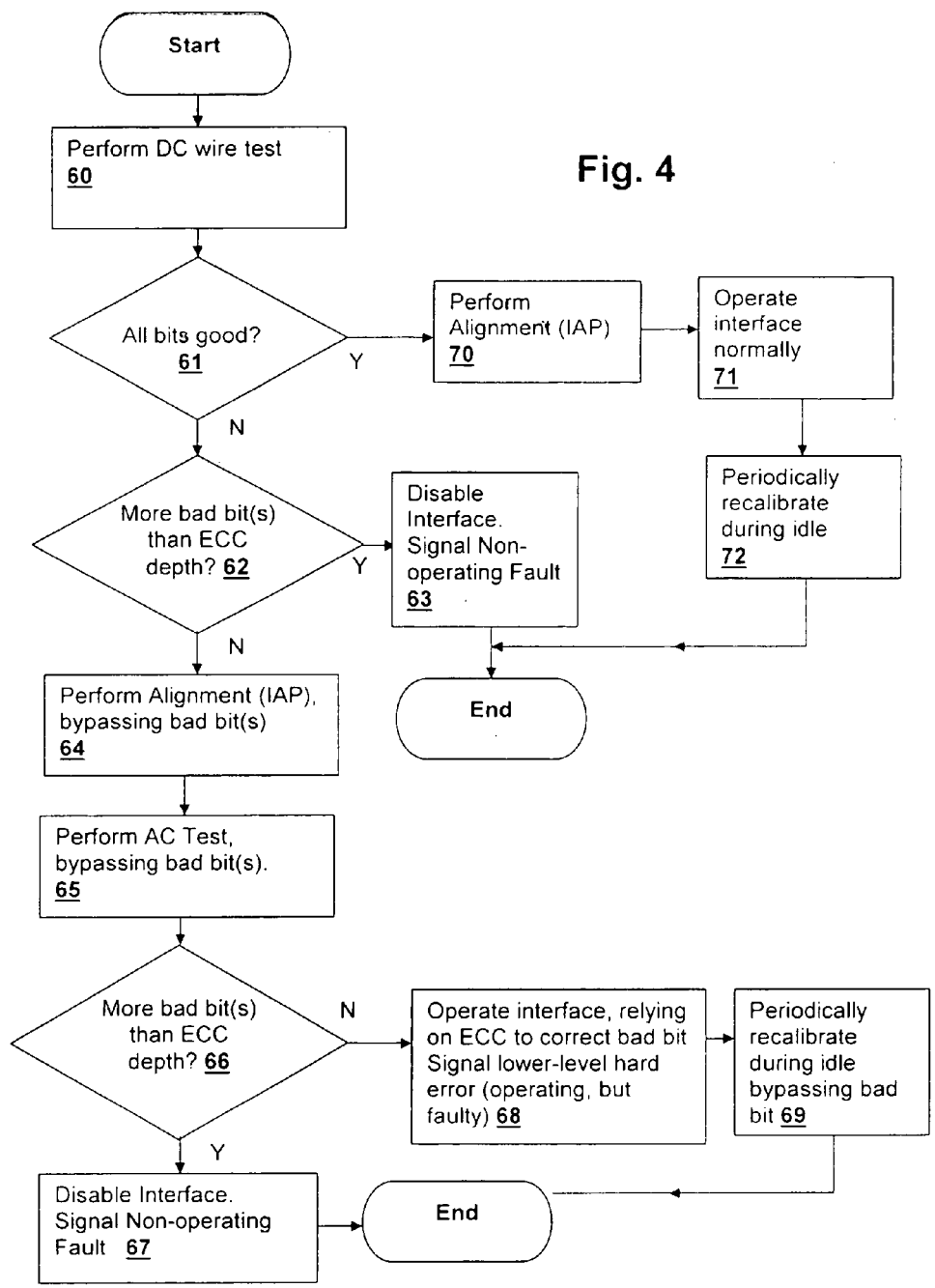
FIG. 4 is a flowchart showing a method in accordance with an embodiment of the present invention.

Referring now to FIG. 4, a method in accordance with an embodiment of the present invention is depicted in a flowchart. For illustrative purposes, the flowchart depicts operation of a system that can detect double-bit errors and correct single-bit errors. First, at initialization, a DC wire test is performed (step 60). If all of the bit paths (wires) are good (decision 61), the IAP is performed (step 70) and the interface is operated normally (step 71), presuming that the interface passes AC testing. The interface is also periodically recalibrated during idle intervals (step 72). If a number of bit paths greater than the ECC correction capacity is found bad (decision 62), the interface is disabled and a non-operating fault is indicated to the supervisory facilities within the system (step 63).

If a number of bits less than the ECC correction capacity is found bad (step 62), then the IAP is performed, bypassing effects of the bad bit paths (step 64). The AC test is then performed, also bypassing effects of the bad bit path (step 65). If further bit paths are detected as bad that exceed the ECC correction capacity (decision 66) by the AC tests, the interface is disabled and a non-operating fault is indicated to the supervisory facilities within the system (step 67). Otherwise, the interface is operated relying on ECC to correct error due to the failed bit path (step 68). A lower-level hard error is also generated to indicate to the supervisory facilities that repair or replacement of an interface component is needed. The interface is also periodically recalibrated during idle intervals, but bypassing the effects of the bad bit path (step 69).

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method of operating an interface coupling a first subsystem and a second subsystem including error checking and correction (ECC), said method comprising:
   initializing said interface including performing one or more tests for verifying a proper operation of a plurality of bit paths of said interface;
   in response to a result of said one or more tests, determining whether or not one or more of said bit paths are faulty and if a number of said faulty bit paths is less than or equal to a correctable bit correction capacity of said ECC; and
   in response to determining that a number of said faulty bit paths is less than or equal to a number of bits of said correction capacity, operating said interface, whereby said ECC corrects errors due to said one or more faulty bit paths.

2. The method of claim 1, wherein said one or more tests includes a static bit value (DC) test and wherein said determining is made by detecting whether or not bit values on said one or more bit paths do not match one or more static values set in said static bit value (DC) test.

3. The method of claim 2, wherein said one or more tests further includes a bit pattern (AC) test and further comprising in response to determining that one or more particular bit paths are faulty, bypassing said bit pattern (AC) test for said particular bit paths.

4. The method of claim 1, further comprising performing an alignment procedure on said interface to optimize operation of said interface, and wherein said alignment procedure is performed selectively only on bit paths determined to be not faulty.

5. The method of claim 1, wherein said one or more tests includes a bit pattern (AC) test and wherein said determining is made by detecting whether or not bit values on said one or more bit paths do not follow a test pattern sent in said bit pattern (AC) test.

6. The method of claim 1, wherein said one or more tests includes a verification of calibration during an interface alignment procedure and wherein said determining is made by detecting whether or not bits on said one or more bit paths can be aligned.

7. The method of claim 1, further comprising
   subsequent to said operating, recalibrating said interface to align only bits on bit paths determined to be not faulty.

8. The method of claim 1, further comprising:
   subsequent to said operating, recalibrating said interface; and
   verifying that bits on one or more of said bit paths cannot be aligned and if a number of said one or more bit paths is less than or equal to a number of bits of a correction capacity of said ECC; and
   in response to determining that said number of said one or more bit paths is less than or equal to said number of bits of said correction capacity, operating said interface normally, whereby said ECC corrects errors due to said one or more bit paths.

9. A circuit for connecting a first subsystem and a second subsystem, said interface comprising:
   an interface including a plurality of bit paths for connecting said first subsystem to said second subsystem;
   an ECC decoder for detecting and correcting a number of errors appearing one or more of said bit paths of said interface;
   testing logic for performing one or more tests for verifying a proper operation of a plurality of bit paths of said interface; and
   control logic coupled to said testing logic for receiving an indication from said testing logic indicating whether or not one or more of said plurality of bit paths are faulty, wherein said control logic in response to said indication determines whether a number of said faulty bit paths is less than or equal to a number of bit of a correction capacity of said ECC and in response to determining that said number of faulty bit paths is less than or equal to said number of bits of said correction capacity, enables said interface to operate, whereby said ECC decoder corrects errors due to said one or more faulty bit paths.

10. The circuit of claim 9, wherein said one or more tests includes a static bit value (DC) test, and wherein said testing logic determines whether or not said one or more bit paths is faulty by detecting that bit values of said one or more bit paths do not match one or more static values set in said static bit value (DC) test.

11. The circuit of claim 10, wherein said one or more tests further includes a bit pattern (AC) test, and wherein said testing logic bypasses AC testing of said one or more faulty bit paths in response to said control logic determining that said one or more bit paths are faulty.

12. The circuit of claim 9, further comprising:
   a plurality of delay lines for delaying bit values of said plurality of bit paths to align the arrival of said bit values with a sampling clock; and
   alignment logic for adjusting said delay lines, and wherein said control logic is coupled to said alignment logic for bypassing a contribution of said one or more faulty bit paths to said adjusting.

13. The circuit of claim 9, wherein said one or more tests includes a bit pattern (AC) test and wherein said testing logic indicates whether or not bit values of said one or more bit paths do not follow a test pattern sent in said bit pattern (AC) test.

14. The circuit of claim 9, wherein said one or more tests includes a verification of calibration during an interface alignment procedure and wherein said testing logic indicates whether or not bit values of said one or more bit paths could not be aligned.

15. The circuit of claim 9, further comprising:
   a plurality of delay lines for delaying bit values of said plurality of bit paths to align the arrival of said bit values with a sampling clock; and
   alignment logic for periodically recalibrating said delay lines during interface idle periods, and wherein said control logic is coupled to said alignment logic for bypassing a contribution of said one or more faulty bit paths to said recalibrating.

16. The circuit of claim 9, further comprising:
   a plurality of delay lines for delaying bit values of said plurality of bit paths to align the arrival of said bit values with a sampling clock; and
   alignment logic for periodically recalibrating said delay lines during interface idle periods, and wherein said alignment logic provides an alignment indication to said control logic indicating whether or not bit values of one or more of said bit paths cannot be aligned, wherein said control logic determines whether or not a number of said non-alignable bit paths is less than or equal to a number of bits of a correction capacity of said ECC, and in response to determining that a number of said non-alignable bit paths is less than or equal to said number of bits of said correction capacity, said control logic signals said alignment logic to bypass a contribution of said one or more non-alignable bit paths and to repeat said recalibrating.

17. The circuit of claim 16, wherein said control logic further signals said alignment logic to perform a full interface alignment.

18. The circuit of claim 9, wherein said first subsystem and said second subsystem are coupled to one or more service processors via one or more test ports, and wherein said control logic is coupled to said one or more test ports for providing said indication from said testing logic to said one or more service processors and wherein said one or more services processors determine whether or not a number of said faulty bit paths is less than or equal to a number of bits of a correction capacity of said ECC and in response to determining that said number of faulty bit paths is less than or equal to said number of bits of said correction capacity, said one or more service processors enable said interface to operate.

19. A circuit, comprising:
- an interface including a plurality of bit paths for connecting said first subsystem to said second subsystem;
- an ECC decoder for detecting and correcting a number of errors appearing one or more bit paths of said interface;
- a plurality of delay lines for delaying bit values of said plurality of bit paths to align the arrival of said bit values of said interface with a sampling clock;
- testing logic for performing one or more tests for verifying a proper operation of said plurality of bit paths of said interface;
- alignment logic for adjusting said delay lines at initialization of the interface; and
- control logic coupled to said testing logic for receiving an indication from said testing logic indicating whether or not one or more of said plurality of bit paths are faulty, wherein said control logic in response to said indication determines whether a number of said faulty bit paths is less than or equal to a number of bits of a correction capacity of said ECC and in response to determining that said number of faulty bit paths is less than or equal to said number of bits of said correction capacity, enables said interface to operate, whereby said ECC decoder corrects errors due to said one or more faulty bit paths, and wherein said control logic is coupled to said alignment logic for bypassing a contribution of said one or more faulty bit paths to said adjusting.

20. The circuit of claim 19, wherein said alignment logic further periodically recalibrates said delay lines during interface idle periods, and wherein said control logic further indicates to said alignment logic to bypassing a contribution of said one or more faulty bit paths to said recalibrating.

* * * * *